UNITED STATES PATENT OFFICE.

JAMES PAUL SCHROEDER, OF WASHINGTON, DISTRICT OF COLUMBIA.

PROCESS OF TREATING PEAT AND MUCK FOR THE PREPARATION OF FERTILIZER.

1,254,365.      Specification of Letters Patent.      Patented Jan. 22, 1918.

No Drawing.      Application filed August 13, 1917. Serial No. 185,990.

(DEDICATED TO THE PUBLIC.)

*To all whom it may concern:*

Be it known that I, JAMES PAUL SCHROEDER, a citizen of the United States of America, and an employee of the Department of Agriculture of the said United States, residing in the city of Washington, District of Columbia, (whose post-office address is Department of Agriculture, Washington, D. C.,) have invented a new Process of Treating Peat and Muck for the Preparation of Fertilizer.

This application is made under the act of March 3, 1883, chapter 143 (22 Stat., 625), and the invention herein described and claimed may be used by the Government of the United States or any of its officers or employees in the prosecution of work for the Government, or any person in the United States, without payment of any royalty thereon.

Peat, which term in the following specification includes the term muck, is partially decomposed vegetable matter which contains varying quantities of nitrogen ranging from one to six per cent. This nitrogen is largely, about ninety-seven to ninety-nine per cent., in the form of complex proteins and related compounds and decomposition products of these. When extracted with boiling sulfuric or hydrochloric acids it is shown to be changed chiefly into the products of primary protein decomposition. The nitrogen in the form of ammonia in the raw peat is generally as low as one-and-one-half to one-tenth per cent. of the total nitrogen present.

My invention relates to the treatment of the peat in such a manner as to render the greater part of this nitrogen soluble so that it becomes at once available for plant use. This is accomplished by heating the peat in boilers with strong sulfuric acid. This treatment results in the hydrolysis of the complex proteins and the formation of simpler compounds soluble in water. After the hydrolysis is complete the excess of sulfuric acid is neutralized by the addition of the proper quantity of phosphate rock. The addition of the latter results in the formation of acid phosphate, a fertilizer material of recognized value, consequently the cost of the excess acid need not be taken into consideration.

The addition of the proper amount of rock phosphate results in the formation of a hard, dry mass which may consequently be ground and pulverized suitable for use as a fertilizer.

Having described the nature of my invention, I claim:

1. A process for the treatment of peat for the preparation of fertilizer which consists of, first, digesting the raw peat with sulfuric acid which results in the hydrolysis of the nitrogenous compounds, occurring in the peat in the form of complex insoluble proteins, into simple compounds that are soluble in water and available for plant use, and second, of subsequently neutralizing the excess acid by adding to the digested material finely ground phosphate rock, which gives the mixture the proper chemical reaction and physical condition for application to the soil.

2. A process for the production of a fertilizer which consists of digesting peat with sulfuric acid and then neutralizing the excess acid not used up in the digestion by adding finely ground phosphate rock which results in the production of a material rich in available nitrogen, phosphoric acid and humus matter in the form of a fine dry non-hygroscopic powder in a proper physical condition to be applied to the soil.

In testimony whereof, I affix my signature in the presence of two subscribing witnesses.

JAMES PAUL SCHROEDER.

Witnesses:
   CHARLES W. BOYLE,
   G. L. HOFFMAN.